(12) United States Patent
Kuellmer et al.

(10) Patent No.: US 12,388,581 B2
(45) Date of Patent: Aug. 12, 2025

(54) DEVICES AND METHOD FOR GRAPHICAL ANALYSIS OF AN IMPAIRMENT OF A DEMODULATED SIGNAL BASED ON MASK TESTING

(71) Applicant: Rohde & Schwarz GmbH & Co. KG, Munich (DE)

(72) Inventors: Alexander Kuellmer, Calw (DE); Oliver Voss, Handeloh (DE)

(73) Assignee: ROHDE & SCHWARZ GMBH & CO. KG, Munich (DE)

(*) Notice: Subject to any disclaimer, the term of this patent is extended or adjusted under 35 U.S.C. 154(b) by 0 days.

(21) Appl. No.: 18/219,954

(22) Filed: Jul. 10, 2023

(65) Prior Publication Data

US 2025/0023671 A1  Jan. 16, 2025

(51) Int. Cl.
*H04L 1/24* (2006.01)

(52) U.S. Cl.
CPC .................... *H04L 1/24* (2013.01)

(58) Field of Classification Search
None
See application file for complete search history.

(56) References Cited

U.S. PATENT DOCUMENTS

| | | | |
|---|---|---|---|
| 6,642,926 B1 | 11/2003 | Letts | |
| 6,665,308 B1* | 12/2003 | Rakib | H04L 27/362 370/479 |
| 7,013,257 B1* | 3/2006 | Nolan | H04B 17/0087 379/27.04 |
| 7,142,609 B2* | 11/2006 | Terreault | H04L 1/206 375/261 |
| 11,038,636 B2* | 6/2021 | Hadani | H04L 27/26532 |
| 2006/0146924 A1* | 7/2006 | Smith | H04L 1/206 725/111 |
| 2008/0123786 A1* | 5/2008 | Wongwirawat | H04L 27/3809 375/346 |
| 2022/0263687 A1* | 8/2022 | Sjödin | H04L 25/0224 |

OTHER PUBLICATIONS

D. Scherer, "Measurement tools for digital video transmission," in IEEE Transactions on Broadcasting, vol. 39, No. 4, pp. 350-363, Dec. 1993, doi: 10.1109/11.259594. (Year: 1993).*

* cited by examiner

*Primary Examiner* — Daniel F. McMahon
(74) *Attorney, Agent, or Firm* — DITTHAVONG, STEINER & MLOTKOWSKI

(57) ABSTRACT

Disclosed are a device for graphical analysis of an impairment of a demodulated signal, and a corresponding process. The device comprises a communication interface and a digital processing logic. The communication interface is configured for receiving the demodulated signal including in-phase and quadrature, I/Q, symbols. The digital processing logic is configured for providing a graphical pixel-based mask defining an allowable spread of the received I/Q symbols in a graphical pixel-based I/Q symbol constellation of the demodulated signal. The allowable spread depends in direction on a type of the impairment and in magnitude on a strength of the impairment. The digital processing logic is further configured for verifying a compliance of the I/Q symbol constellation of the demodulated signal with the mask.

16 Claims, 5 Drawing Sheets

DEVICES AND METHOD FOR GRAPHICAL ANALYSIS OF AN IMPAIRMENT OF A DEMODULATED SIGNAL BASED ON MASK TESTING

TECHNICAL FIELD

The present disclosure relates to measurement technology relating to digital modulation schemes, and in particular to devices and a method for graphical analysis of an impairment of a demodulated signal.

BACKGROUND ART

Digital modulation may refer to a process of varying one or more properties of a periodic waveform, called a carrier wave, in accordance with digital information to be transmitted. Depending on said digital information to be transmitted and on the varied properties such as amplitude and/or phase, the modulated carrier wave may cycle between a finite set of complex-valued symbols being representative of different binary information snippets (i.e., one or more bits per symbol) to be transmitted. The symbols may collectively form a symbol constellation in the complex plane.

On the receiving side, the symbols and thus the transmitted binary information snippets may be recovered by way of demodulation/extraction from the modulated carrier wave, and for diagnostic purposes the received symbol constellation may be inspected on an appropriate measurement device.

Currently, a judgement if an error occurred or not requires human inspection of such constellation diagrams. Evidently, no continuous observation can take place.

SUMMARY

It is an object to overcome the above-mentioned and other drawbacks. The foregoing and other objects are achieved by the features of the appended independent claims. Preferred embodiments are set forth in the dependent claims and in the following description and drawings.

A first aspect of the present disclosure relates to a device for graphical analysis of an impairment of a demodulated signal. The device comprises a communication interface and a digital processing logic. The communication interface is configured for receiving the demodulated signal including in-phase and quadrature, I/Q, symbols. The digital processing logic is configured for providing a graphical pixel-based mask defining an allowable spread of the received I/Q symbols in a graphical pixel-based I/Q symbol constellation of the demodulated signal. The allowable spread depends in direction on a type of the impairment and in magnitude on a strength of the impairment. The digital processing logic is further configured for verifying a compliance of the I/Q symbol constellation of the demodulated signal with the mask.

An impairment as used herein may refer to a degradation of a received demodulated signal by unwanted effects which may reduce the reception quality. Such an impairment may be of a certain type, such as amplitude noise, phase noise and/or other sources of impairments, and have a certain strength (i.e., impact on the reception quality).

A communication interface as used herein may refer to a digital logic for a transfer of information in the form of digital data, such as a digital bitstream or a digitized analog signal. For example, said information may comprise a stream of I/Q symbols of the demodulated signal, or a stream of graphical pixel-based I/Q symbol constellations of the demodulated signal.

A digital processing logic as used herein may refer to a digital logic for processing of digital data based on digital logic and/or arithmetic operations.

Digital modulation as used herein may refer to a process of varying one or more properties such as amplitude and/or phase of a periodic waveform, called a carrier wave, in accordance with digital information to be transmitted. Exemplary digital modulation schemes comprise amplitude shift keying (ASK, such as OOK), phase shift keying (PSK, such as 8-PSK), amplitude/phase shift keying (APSK, such as 16-QAM) and the like.

In-phase and quadrature (I/Q) symbols as used herein may refer to complex-valued discrete symbols of a digital modulation scheme.

An I/Q symbol constellation as used herein may refer to a compilation/rendering of a plurality of I/Q symbols, wherein the complex-valued I/Q symbols are mapped onto a two-dimensional, graphical pixel-based plane.

A mask as used herein may refer to a full or partial cover for an I/Q symbol constellation in its two-dimensional, graphical pixel-based plane.

A spread as used herein may refer to an actual expansion of a plurality of I/Q symbols around corresponding nominal I/Q symbols in the two-dimensional, graphical pixel-based plane of the I/Q symbol constellation. Such a spread may have a (preferential) direction, such as omni-directional, radial, or circumferential, and may have a magnitude (stretch, dimension) in said direction.

An allowable spread as used herein may refer to a reference expansion of a plurality of I/Q symbols around a corresponding nominal I/Q symbol in the two-dimensional, graphical pixel-based plane of the I/Q symbol constellation.

The demodulated signal may comprise a baseband signal being extracted from a radio frequency, RF, or optical carrier wave.

A radio frequency (RF) as used herein may refer to a frequency range roughly between an upper limit of audio frequencies (around 20 kHz) and around 300 GHz at which an electromagnetic field can radiate off a conductor into space as a radio wave, thereby forming an RF signal. An optical frequency as used herein may refer to a frequency (or wavelength) range roughly between around 300 GHz (0.1 cm) and 3 PHz (0.1 μm).

The impairment may originate from a transmitter, a channel and/or a receiver of the carrier wave.

The type of the impairment may comprise one or more of: amplitude noise, phase noise, dispersion, distortion, crosstalk, and gain imbalance.

The allowable spread may extend omni-directionally in the I/Q symbol constellation.

The allowable spread may extend in a radial direction of the I/Q symbol constellation, if the type of impairment comprises the amplitude noise.

The allowable spread may extend in a circumferential direction of the I/Q symbol constellation, if the type of impairment comprises the phase noise.

The strength of the impairment may depend on one of: an error vector magnitude, EVM, value, a bit error ratio, BER, value, a symbol error ratio, SER, value, and a signal-to-noise ratio, SNR, value.

An error vector magnitude (EVM) as used herein may refer to a measure of deviation of an actual I/Q symbol from a corresponding reference I/Q symbol in the complex plane.

A bit error ratio (BER) as used herein may refer to a ratio of a number of received bit errors and a total number of received bits during a time interval.

A symbol error ratio (SER) as used herein may refer to a ratio of a number of received I/Q symbol errors and a total number of received I/Q symbols during a time interval.

A signal-to-noise ratio (SNR) as used herein may refer to a ratio of a signal power to a noise power of a received demodulated signal.

The digital processing logic may further be configured for providing the mask based on a given hypothesis of a root cause of the impairment of the demodulated signal.

The digital processing logic may further be configured for confining the received I/Q symbols of the demodulated signal to the mask based on a given analog or digital filter.

The given filter algorithm may comprise one or more of: a video bandwidth filter, a low-pass filter, a band-pass filter, a high-pass filter, and a digital symbol filter.

The communication interface may comprise one of: a universal serial bus, USB, interface, a local area network, LAN, interface, a digital video interface.

Universal serial bus (USB) and local area network (LAN) as used herein may respectively refer to industry standards that establish, inter alia, protocol specifications for interfacing (i.e., connection, communication and power supply) between computers, peripherals and other devices such as measurement systems. A digital video interface as used herein may refer to a digital logic for digital communication of video signals, such as a High-Definition Multimedia Interface (HDMI), DisplayPort, and the like.

The digital processing logic may comprise one or more of: an application-specific integrated circuit, ASIC, a field-programmable gate array, FPGA, a digital signal processor, DSP, a central processing unit, CPU, and a graphics processing unit, GPU.

The device may further comprise a digital memory for maintaining the I/Q symbol constellation of the demodulated signal.

A digital memory as used herein may particularly refer to a solid-state random-access memory (RAM).

For verifying a compliance of the I/Q symbol constellation of the demodulated signal with the mask, the digital processing logic may further be configured for masking the I/Q symbol constellation of the demodulated signal with the mask; and verifying a full cover of the masked I/Q symbol constellation.

A second aspect of the present disclosure relates to a process of graphical analysis of an impairment of a demodulated signal. The process comprises receiving the demodulated signal including in-phase and quadrature, I/Q, symbols. The process further comprises providing a graphical pixel-based mask defining an allowable spread of the received I/Q symbols in a graphical pixel-based I/Q symbol constellation of the demodulated signal. The allowable spread depends in direction on a type of the impairment and in magnitude on a strength of the impairment. The process further comprises verifying a compliance of the I/Q symbol constellation of the demodulated signal with the mask.

BRIEF DESCRIPTION OF DRAWINGS

The above-described aspects and implementations will now be explained with reference to the accompanying drawings, in which the same or similar reference numerals designate the same or similar elements.

The features of these aspects and implementations may be combined with each other unless specifically stated otherwise.

Figure 1:
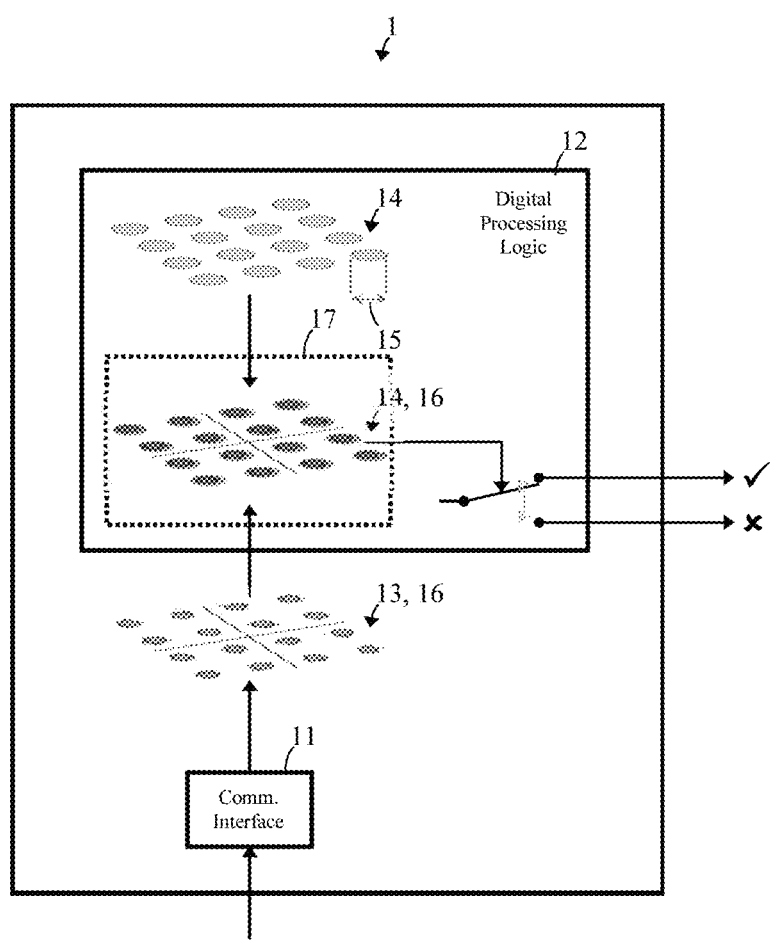

The drawings are to be regarded as being schematic representations, and elements illustrated in the drawings are not necessarily shown to scale. Rather, the various elements are represented such that their function and general purpose become apparent to those skilled in the art.

Throughout the present disclosure, expressions such as 'configured for (do)ing' and 'configured to (do)' may refer to a same limitation.

Figure 2:
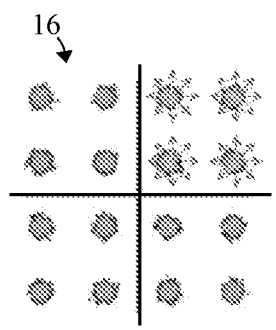
Figure 3:
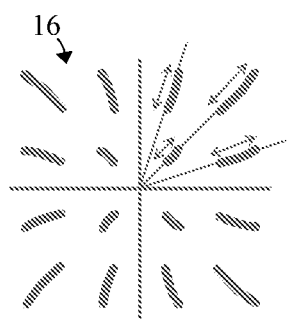
Figure 4:
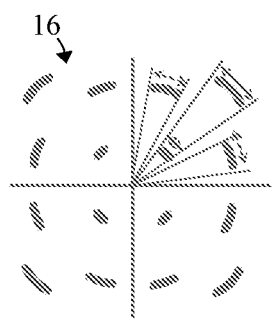
Figure 5:
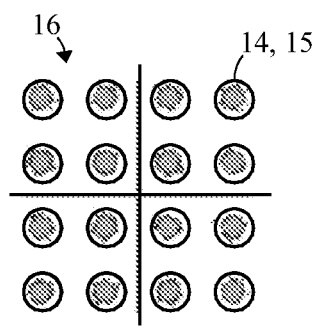
Figure 6:
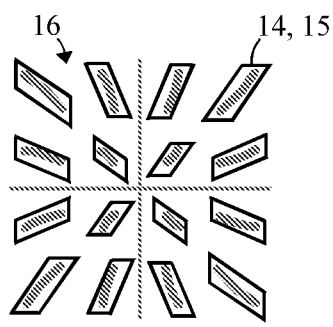
Figure 7:
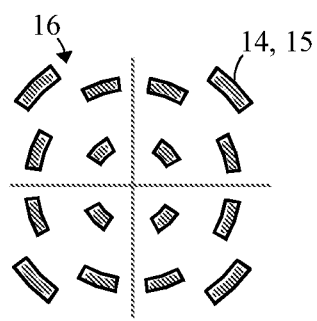
Figure 8:
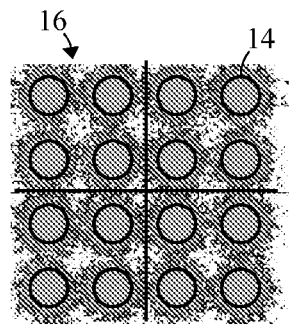
Figure 9:
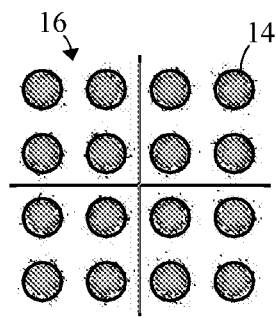
Figure 10:
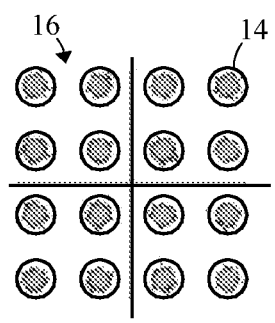
Figure 11:
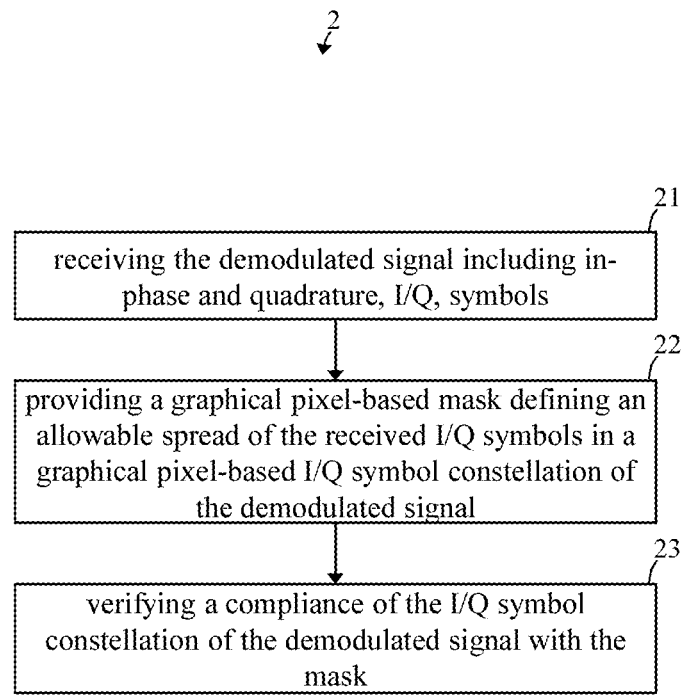

FIG. 1 illustrates a device for graphical analysis of an impairment of a demodulated signal in accordance with the present disclosure;

FIGS. 2-4 illustrate exemplary I/Q symbol constellations of the demodulated signal for various impairments of the demodulated signal;

FIGS. 5-7 illustrate exemplary masks defining an allowable spread of the received I/Q symbols of FIGS. 2-4;

FIGS. 8-10 illustrate progressively confined I/Q symbols of the demodulated signal relative to the mask of FIG. 5; and FIG. 11 illustrates a process for graphical analysis of an impairment of a demodulated signal in accordance with the present disclosure.

DETAILED DESCRIPTIONS OF DRAWINGS

FIG. 1 illustrates a device 1 for graphical analysis of an impairment of a demodulated signal in accordance with the present disclosure.

The demodulated signal may comprise a baseband signal being extracted from a radio frequency (RF) or optical carrier wave.

The impairment may originate from a transmitter, a channel and/or a receiver of the carrier wave.

The device 1 comprises a communication interface 11.

The communication interface 11 may comprise one of a universal serial bus (USB) interface, a local area network (LAN) interface, and a digital video interface such as a HDMI or DisplayPort interface, or any other appropriate communication interface.

The communication interface 11 is configured for receiving the demodulated signal including in-phase and quadrature (I/Q) symbols 13.

More specifically, in case of the USB or LAN interface, the communication interface 11 is configured to receive a stream of the I/Q symbols 13 of the demodulated signal, whereas in case of the digital video interface, the communication interface 11 is configured to receive a stream of graphical pixel-based I/Q symbol constellations 16 of the demodulated signal.

The device 1 further comprises a digital processing logic 12.

The digital processing logic 12 may comprise one or more of an application-specific integrated circuit (ASIC), a field-programmable gate array (FPGA), a digital signal processor (DSP), a central processing unit (CPU) and a graphics processing unit (GPU).

The digital processing logic 12 is configured for providing a graphical pixel-based mask 14 defining an allowable spread 15 (or distribution) of the received I/Q symbols 13 in the graphical pixel-based I/Q symbol constellation 16 of the demodulated signal, wherein the allowable spread 15 depends in direction on a type of the impairment and in magnitude on a strength of the impairment.

The digital processing logic 12 may further be configured for providing the mask 14 based on a given hypothesis of a root cause of the impairment of the demodulated signal. For example, given the hypothesis that a phase noise forms the root cause of the impairment of the demodulated signal, a mask 14 taking into account the phase noise may be provided.

The device 1 may further comprise a digital memory 17 for maintaining the I/Q symbol constellation 16 of the demodulated signal, no matter if the graphical pixel-based I/Q symbol constellation 16 is received as a video stream via the digital video interface or compiled/rendered from the stream of I/Q symbols 13 received via the USB or LAN (or similar) interface.

The digital processing logic 12 is further configured for verifying a compliance of the I/Q symbol constellation 16 of the demodulated signal with the mask 14. In more detail, the digital processing logic 12 may further be configured for masking the I/Q symbol constellation 16 of the demodulated signal with the mask 14 and for verifying a full cover of the masked I/Q symbol constellation 16, as indicated in FIG. 1.

For example, given the I/Q symbol constellation 16 of the demodulated signal and the mask 14 as set pixels of respective raster images, each set pixel of the mask 14 may mask/hide the corresponding pixel of the I/Q symbol constellation 16. If it is established that the resulting masked I/Q symbol constellation 16 fails to comprise any set pixels, then the mask 14 achieves a full cover of the masked I/Q symbol constellation 16. Less relevant I/Q symbols 13, if any, may be masked more extensively. For example, the mask 14 may comprise a contiguous section covering one or more less relevant I/Q symbols 13.

In FIG. 1, the verification is symbolically indicated by a switch symbol which may toggle between a compliance state (indicated by a '✓' check mark) and a non-compliance state (indicated by an '✗' mark) in response to the established full or partial cover.

The adaptation of mask testing to I/Q constellation diagram testing gives the chance to automatically detect if received signals are within a defined interval or not over long periods and in addition how often a violation occurs.

This may lead to a higher probability of capturing rarely occurring violations, decrease the human factor of recognizing rare events that are out of bounds, which especially becomes hard to tell when higher QAM grades are used, as many constellation points would have to be observed in parallel.

In addition this time consuming measurement can be done without the need of having an operator sitting in front of the instrument.

In summary, a higher degree of automation, a higher probability of observing significant transmission errors, and more reliability and higher throughput and/or continuous monitoring for such analysis may be achieved.

FIGS. 2-4 illustrate exemplary I/Q symbol constellations 16 of the demodulated signal for various types of impairments of the demodulated signal.

In particular, the type of the impairment may comprise one or more of: amplitude noise, phase noise, dispersion, distortion, crosstalk, gain imbalance, and other sources of impairments.

In accordance with FIG. 2, a spread of the received I/Q symbols 13 may extend omni-directionally in (i.e., relative to the respective nominal I/Q symbol of) the I/Q symbol constellation 16 of the demodulated signal.

In accordance with FIG. 3, wherein the type of impairment comprises the amplitude noise, the spread of the received I/Q symbols 13 may extend radially in (i.e., relative to an origin of) the I/Q symbol constellation 16 of the demodulated signal.

In accordance with FIG. 4, wherein the type of impairment comprises the phase noise, a spread of the received I/Q symbols 13 may extend circumferentially in (i.e., relative to an origin of) the I/Q symbol constellation 16 of the demodulated signal.

FIGS. 5-7 illustrate exemplary masks 14 defining an allowable spread 15 of the received I/Q symbols 13 of FIGS. 2-4.

In accordance with FIG. 5, the allowable spread 15 may extend omni-directionally in the I/Q symbol constellation 16 in the complex plane.

In accordance with FIG. 6, the allowable spread 15 may extend in a radial direction of the I/Q symbol constellation 16 in the complex plane, if the type of impairment comprises the amplitude noise.

In accordance with FIG. 7, the allowable spread 15 may extend in a circumferential direction of the I/Q symbol constellation 16 in the complex plane, if the type of impairment comprises the phase noise.

Depending on the circumstances, the type of impairment may not be monocausal, so that the allowable spread 15 may in turn depend in direction on multiple root causes. For example, the allowable spread 15 may extend in the radial direction as well as in the circumferential direction, if the type of impairment comprises the amplitude noise as well as the phase noise. Similar considerations apply for other combinations and/or permutations of the types of impairments.

In particular, the strength of the impairment (and thus the magnitude, stretch, or dimension) in said direction(s) may depend on one of: an error vector magnitude, EVM, value, a bit error ratio, BER, value, a symbol error ratio, SER, value, and a signal-to-noise ratio, SNR, value.

FIGS. 8-10 illustrate progressively confined I/Q symbols 13 of the demodulated signal relative to the mask 14 of FIG. 5.

To this end, the digital processing logic 12 may further be configured for confining the received I/Q symbols 13 of the demodulated signal to the mask 14 based on a given analog or digital filter.

The given filter may comprise one or more of: a video bandwidth filter, a low-pass filter, a band-pass filter, a high-pass filter, and a digital symbol filter.

In accordance with FIG. 8, the I/Q symbols 13 of the demodulated signal have not been confined relative to the mask 14 of FIG. 5, so that the masking of the I/Q symbol constellation 16 of the demodulated signal with the mask 14 does not result in a full cover of the masked I/Q symbol constellation.

In accordance with FIG. 9, the I/Q symbols 13 of the demodulated signal have been confined relative to the mask 14 of FIG. 5 to an extent such that the partial cover of the masked I/Q symbol constellation is improved.

In accordance with FIG. 10, the I/Q symbols 13 of the demodulated signal have been confined relative to the mask 14 of FIG. 5 to an extent such that the full cover of the masked I/Q symbol constellation is achieved and can be verified.

FIG. 11 illustrates a process 2 for graphical analysis of an impairment of a demodulated signal in accordance with the present disclosure.

The process 2 comprises receiving 21 the demodulated signal including in-phase and quadrature, I/Q, symbols 13.

The process 2 further comprises providing 22 a graphical pixel-based mask 14 defining an allowable spread 15 of the received I/Q symbols 13 in a graphical pixel-based I/Q symbol constellation 16 of the demodulated signal. The allowable spread 15 depends in direction on a type of the impairment and in magnitude on a strength of the impairment.

The process 2 further comprises verifying 23 a compliance of the I/Q symbol constellation 16 of the demodulated signal with the mask 14.

The invention claimed is:

1. A device for graphical analysis of an impairment of a demodulated signal, the device comprising a communication interface, being configured for
receiving the demodulated signal including in-phase and quadrature, I/Q, symbols; and a digital processing logic, being configured for
providing a graphical pixel-based mask defining an allowable spread of the received I/Q symbols in a graphical pixel-based I/Q symbol constellation of the demodulated signal, the allowable spread depending in direction on a type of the impairment and in magnitude on a strength of the impairment, wherein the allowable spread corresponds to a reference expansion of the I/Q symbols around a corresponding nominal I/Q symbol in two-dimensional plane of the graphical pixel-based I/Q symbol constellation; and
verifying a compliance of the I/Q symbol constellation of the demodulated signal with the graphical pixel-based mask.

2. The device of claim 1,
the demodulated signal comprising a baseband signal being extracted from a radio frequency, RF, or optical carrier wave.

3. The device of claim 2,
the impairment originating from a transmitter, a channel and/or a receiver of the carrier wave.

4. The device of claim 3,
the type of the impairment comprising one or more of:
amplitude noise
phase noise,
dispersion,
distortion,
crosstalk, and
gain imbalance.

5. The device of claim 4,
the allowable spread extending omni-directionally in the I/Q symbol constellation.

6. The device of claim 4,
the allowable spread extending in a radial direction of the I/Q symbol constellation, if the type of impairment comprises the amplitude noise.

7. The device of claim 4,
the allowable spread extending in a circumferential direction of the I/Q symbol constellation, if the type of impairment comprises the phase noise.

8. The device of claim 1,
the strength of the impairment depending on one of:
an error vector magnitude, EVM, value,
a bit error ratio, BER, value,
a symbol error ratio, SER, value, and
a signal-to-noise ratio, SNR, value.

9. The device of claim 1,
the digital processing logic further being configured for
providing the graphical pixel-based mask based on a given hypothesis of a root cause of the impairment of the demodulated signal.

10. The device of claim 1,
the digital processing logic further being configured for
confining the received I/Q symbols of the demodulated signal to the graphical pixel-based mask based on a given analog or digital filter.

11. The device of claim 10,
the given analog or digital filter comprising one or more of:
a video bandwidth filter,
a low-pass filter,
a band-pass filter,
a high-pass filter, and
a digital symbol filter.

12. The device of claim 1,
the communication interface comprising one of:
a universal serial bus, USB, interface,
a local area network, LAN, interface, and
a digital video interface.

13. The device of claim 1,
the digital processing logic comprising one or more of:
an application-specific integrated circuit, ASIC,
a field-programmable gate array, FPGA,
a digital signal processor, DSP,
a central processing unit, CPU, and
a graphics processing unit, GPU.

14. The device of claim 1, further comprising a digital memory for
maintaining the I/Q symbol constellation of the demodulated signal.

15. The device of claim 1, wherein
for verifying a compliance of the I/Q symbol constellation of the demodulated signal with the graphical pixel-based mask, the digital processing logic further being configured for
masking the I/Q symbol constellation of the demodulated signal with the graphical pixel-based mask; and
verifying a full cover of the masked I/Q symbol constellation.

16. A process of graphical analysis of an impairment of a demodulated signal, comprising
receiving the demodulated signal including in-phase and quadrature, I/Q, symbols;
providing a graphical pixel-based mask defining an allowable spread of the received I/Q symbols in a graphical pixel-based I/Q symbol constellation of the demodulated signal, the allowable spread depending in direction on a type of the impairment and in magnitude on a strength of the impairment, wherein the allowable spread corresponds to a reference expansion of the I/Q symbols around a corresponding nominal I/Q symbol in two-dimensional plane of the graphical pixel-based I/Q symbol constellation; and
verifying a compliance of the I/Q symbol constellation of the demodulated signal with the graphical pixel-based mask.

* * * * *